United States Patent [19]

Döbbeler

[11] Patent Number: 4,884,930
[45] Date of Patent: Dec. 5, 1989

[54] PANEL FASTENER WITH FRICTION CONES

[75] Inventor: Peter Döbbeler, Kelkheim, Fed. Rep. of Germany

[73] Assignee: Camloc GmbH, Kelkheim, Fed. Rep. of Germany

[21] Appl. No.: 241,006

[22] Filed: Sep. 2, 1988

[30] Foreign Application Priority Data

Sep. 3, 1987 [DE] Fed. Rep. of Germany ....... 3729422

[51] Int. Cl.$^4$ .................. F16B 31/00; F16B 39/00
[52] U.S. Cl. ........................ 411/6; 411/105; 411/353
[58] Field of Search ............ 411/1, 6, 10–12, 411/103, 105, 149, 150, 223, 231, 352, 353, 999

[56] References Cited

U.S. PATENT DOCUMENTS

| | | |
|---|---|---|
| 3,294,140 | 12/1966 | Cosenza . |
| 3,730,243 | 5/1973 | Smith .................... 411/105 |
| 4,191,236 | 3/1980 | Duran .................... 411/105 |
| 4,377,361 | 3/1983 | Frieberg . |
| 4,431,353 | 2/1984 | Capuano ................. 411/11 |
| 4,616,967 | 10/1986 | Molina ................... 411/105 |
| 4,692,075 | 9/1987 | Metz ..................... 411/105 |

FOREIGN PATENT DOCUMENTS

| | | |
|---|---|---|
| 1252006 | 5/1968 | Fed. Rep. of Germany . |
| 1475041 | 10/1969 | Fed. Rep. of Germany . |
| 1450944 | 5/1971 | Fed. Rep. of Germany . |
| 2142488 | 3/1972 | Fed. Rep. of Germany . |
| 2700605 | 12/1977 | Fed. Rep. of Germany . |
| 2947612 | 10/1980 | Fed. Rep. of Germany . |
| 8700319 | 1/1987 | Fed. Rep. of Germany . |

OTHER PUBLICATIONS

"Live Lock Structural Panel Fasteners," Tridair Fasteners, Catalog No. 3500.

*Primary Examiner*—Neill R. Wilson
*Attorney, Agent, or Firm*—Pretty, Schroeder, Brueggemann & Clark

[57] ABSTRACT

A fastener apparatus for joining together a plurality of plates, including an internally-threaded pin adapted to be guided through aligned openings in the plates and a generally cup-shaped accommodating element that can be tightened with the pin via a threaded bolt mounted centrally therein. The accommodating element carries one or more springs for yieldably resisting entry of the pin and further carries two locking washers accommodated on the threaded bolt, for preventing an unintended loosening of the pin out of its tightened position. The locking washer that faces the pin is rotatably guided and axially displacable up to an external stop of the accommodating element, and the locking washer that faces away from the pin is rotation-fast but guided in displacable fashion within the accommodating element, axially against yielding bias of the spring. When a torque is applied by the pin that exceeds a certain value, the two locking washers are rotatable relative to each other, such that the pin can be threaded onto the bolt. In addition, the locking washers are configured to have frusto-conical surfaces that compressively engage each other, the surfaces providing an adhering friction when the pin is fully threaded onto the bolt, and a lesser, sliding friction when one surface is rotating relative to the other.

7 Claims, 3 Drawing Sheets

PANEL FASTENER WITH FRICTION CONES

BACKGROUND OF INVENTION

This invention relates generally to fasteners for joining together two or more plates, and, more particularly, to fasteners having an internally-threaded pin adapted to be guided through aligned openings in the plates and a cup-shaped accommodating element that can be tightened with the pin via a threaded bolt mounted centrally therein.

In fasteners of this particular kind, the cup-shaped accommodating element is typically provided with spring means acting opposite to the direction of entry of the pin. Two locking washers or disks are typically accommodated on the threaded bolt and engage each another when in the tightened position. The locking washer facing the pin is rotatably guided and axially displacable up to an external stop of the accommodating element, and the locking washer facing away from the pin is rotation-fast but guided in displacable fashion within the accommodating element, axially against the spring means. The pin-side locking washer, under action of a moment of rotation applied by the pin that exceeds a certain value, is rotatable relative to the locking washer facing away from the pin, whereby the pin can be screwed onto the threaded bolt up to the tightened position.

The type of fastener described briefly above is generally known. Such fasteners are used primarily for releasably fastening structural and non-structural connections that are exposed to high tension and shear stresses, as well as to vibrations. They are particularly well suited for use in aircraft, for example, in fastening cover plates, cowlings and maintenance hatches. In this particular area of application, these types of fasteners are usually exposed to a great number of load cycles, whereby individual forces can assume relatively high values. In addition, vibrations can promote loosening of fasteners of this type.

Known fasteners of this type typically further have separate locking means for preventing an unintended loosening of the fastener in the tightened condition. This commonly takes the form of two disks toothed opposite to each other. However, it has been shown in practice that load cycles and vibrations can occur so that the fastener can remain completely open, at least to the extent that the axial bias is lost. Since the fastener, besides the pure holding function in the tightened condition, is also stressed by shearing, it can loosen itself not only in the case of disappearing bias, but also by failing to transfer the shearing stresses. Another disadvantage to fastener of this type is that, because of engagement of two gears as a securing means, there ensues only a discrete clamping process, which can lead to an insufficient clamping or tightening of the plates. Furthermore, the toothed disks are relatively costly to manufacture.

It is therefore an object of the present invention to provide a fastener of the initially mentioned type that guarantees a positive transferring of stresses, assures an axial bias corresponding to the moment of rotation introduced, and guarantees an adequate clamping of the plates.

SUMMARY OF THE INVENTION

In accordance with the invention, the objective described above is met by constructing the locking washers as friction disks whose contacting surfaces in the locking position lie against each other with adhering friction and, with rotation against each other, lie against each other with a lesser, sliding friction. In this fashion, a constant and reliable tightening of the plates against each other is possible. The bracing or tightening corresponds to the moment of rotation introduced. The construction of the locking means in accordance with the invention therefore rests not on the principle of the usual type gearing with tooth surfaces; rather, the securing means rest upon the principle of sliding and adhering friction. Adhering friction, after introduction of the moment of rotation and reaching the desired axial tightening, prevents loosening of the connection, since the moments of rotation that can be taken up by the adhering friction are greater than the return moments of rotation that occur through the spring means acting counter to the pin. The contacting surfaces of the locking washers therefore wear substantially less than do the toothed surfaces of the prior washers. The locking washers also offer a high degree of security against impurities and resulting failure, since, upon actuation, they form no intermediate space in which impurities can deposit themselves. The friction disks utilized as locking washers are furthermore less costly to manufacture than the usual toothed disks.

The contacting surfaces of the friction disks can be substantially linear or crowned. In one embodiment of the invention, however, the contacting surfaces of the locking washers be formed as concentric internal and external conical surfaces. By altering the cone angle, the fastener can thereby be set very simply relative to the securing moment of the friction disk arrangement, taking into consideration any special conditions. The cone angle of the contacting surfaces of the locking washers is advantageously close to self-locking. To guarantee a lasting, functionally correct use of the fastener in accordance with the invention, at least one of the contacting surfaces of the locking washers can be formed of a wear-fast material containing a permanent lubricant such as graphite.

In the embodiment described above, the locking washers are pressed against each other by the spring means with a force that is dependent upon the depth of penetration of the pin. In an alternative embodiment, the locking moment is independent of the depth of penetration. In that embodiment, the locking washers are encapsulated together into a construction unit and are pressed against each other by a spring element integrated into the construction unit, with a force that is independent of the depth of penetration of the pin into the accommodating element. This idea for a solution can be realized in a particularly simple fashion by the fact that the first locking washer grips through an opening of the second locking washer out from one side with a clamping claw, and grips behind the back side with interposition of a spring. The construction unit can be initially assembled and then placed on the floor of the accommodating element, whereby the mounting work is substantially simplified. Encapsulation of the locking washers and the additional spring can also be used to further reduce the danger of impurities in the locking washers.

In the case of the known fasteners, the toothed disk facing away from the pin supports itself on two helical springs of different diameter, which are tuned to each other such that resonances are avoided in the case of vibrations. This principle can also be used within the framework of the present invention. For constructional simplification of the fastener in accordance with the invention, however, additionally proposed is that the spring means resisting entry of the pin display a single helical spring but wound differently in its diameter.

In a further embodiment of the invention, the pin-side locking washer is constructed as one piece with the pin.

Further goals, features, advantages and application possibilities of the present invention are obtained from the following description of the preferred embodiments of the invention, taken with the aid of the accompanying drawing.

DESCRIPTION OF THE PREFERRED EMBODIMENTS

Figure 1:
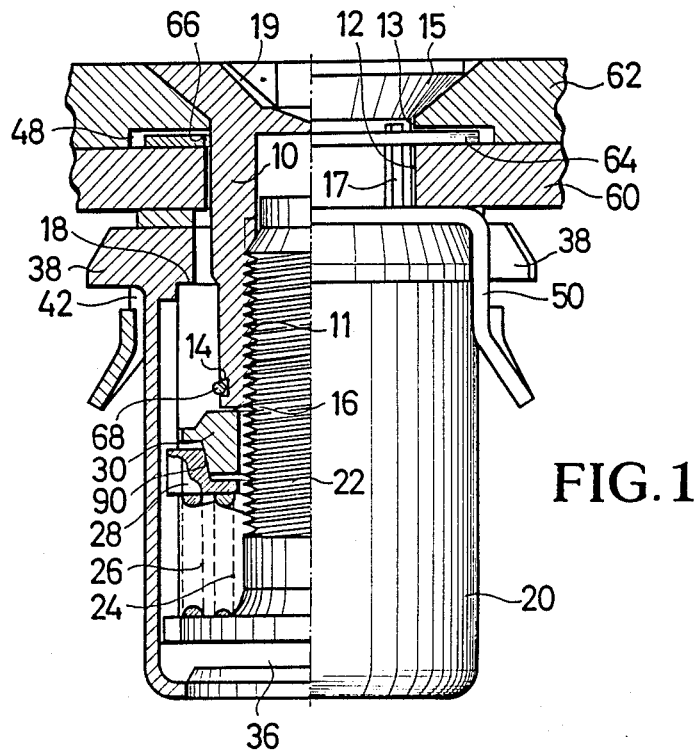
FIG. 1 is an elevational view, partially in section, of a complete fastener in accordance with one embodiment of the invention, shown in a tightened position.
Figure 2:
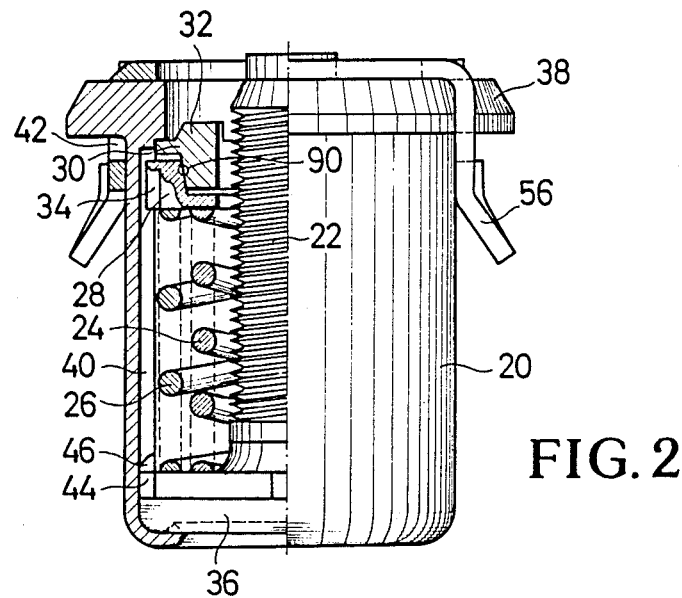
FIG. 2 is a view of the fastener, similar to FIG. 1, but with the pin removed and the components in their relaxed positions.
Figure 3:
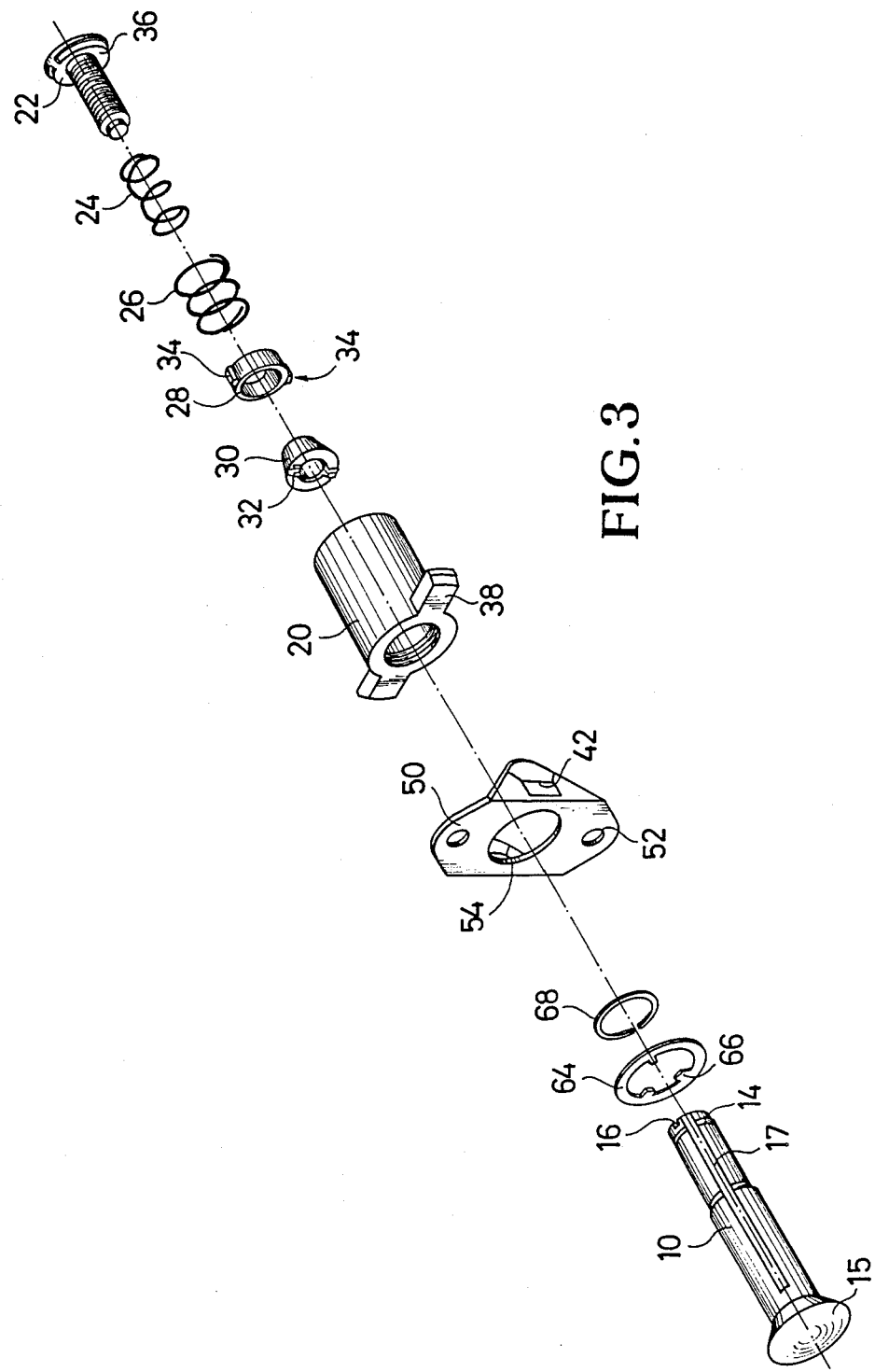
FIG. 3 is an exploded perspective view of the fastener of FIGS. 1 and 2.

With reference now to FIGS. 1-3, there is shown a fastener for joining together two plates 60 and 62. The fastener includes a pin 10 that has internal threads 11 and that can be guided through aligned openings 12 and 13 of the respective plates 60 and 62. A cup-shaped accommodating element 20 carries a threaded bolt 22 centrally within it, to receive and tighten against the pin. The cooperating threads of the pin and the threaded bolt are preferably a multiple-movement threads. The accommodating element 20 also carries helical springs 24 and 26 that yieldably resist entry of the pin. To avoid resonances, the springs preferably have different diameters and, because of this, can also be joined together.

Located on the threaded bolt 22 are two locking washers or disks 28 and 30, which function as friction disks to prevent an unintended loosening of the pin 10 from its locked or tightened position. In the locked position, the contacting surfaces of the locking washers contact each other with adhering friction. On the other hand, when the contacting surfaces are turning against each other, they grip each other with a lesser, sliding friction. The locking washer 30 that faces the pin can be rotated inside the accommodating element 20 with the aid of the pin, and it can be displaced axially up to a top stop 18 of the accommodating element. For this purpose, flanges 32 on the top side of the locking washer 30 engage grooves 16 on the lower end of the pin 10. This interlocking engagement can alternatively be reversed. The pin's head 15 as a slot 19 for receiving a turning tool. The locking washer 28 that faces away from the pin is axially displacable inside the accommodating element, but is rotation-fast. For this purpose, the accommodating element has on its inner wall two grooves 40 lying diametrically opposite to each other and further has a ring-shaped ledge or shoulder 44 located near the floor of the element. The locking washer 28 includes two cams 34 located diametrically opposite from each other, for engagement with the grooves 40 of the accommodating element. This prevents rotation of the locking washer 28 when the pin is threaded onto the bolt.

The locking washer 30 has a frusto-conical add-on piece that projects into a corresponding frusto-conical recess of the locking washer 28. The cone angle 90 of the contacting frusto-conical surfaces is self-locking. It can be specially selected according to the desired securing moment. The contacting surfaces are preferably formed of a wear-resistant material containing a permanent lubricating substance such as graphite. In the fastener embodiment of FIGS. 1-3, the locking washers are pressed against each other by the two helical springs 24 and 26. Accordingly, the securing moment is dependent upon the depth of the pin's penetration.

For mounting the accommodating element 20 with the construction components contained therein, the locking washer 30 is initially introduced through an almost completely open floor opening of the accommodating element, with the frusto-conical surface facing downwardly (with reference to the vertical orientation of FIGS. 1 and 2). Next, the locking washer 28 is laid, with its conical recess facing upwardly, against the locking washer 30. Then the two equal-length helical springs 24 and 26 are pushed into each other and placed behind the two disks washers. Next, the threaded bolt 22, which has on its head 36 four radial projections 46 disposed at angles of 90 degrees to one another, is introduced from below into the accommodating element 20. The bolt is then rotated until two oppositely lying projections 46 engage the two inner grooves 40 of the accommodating element 20. This prevents rotation of the threaded bolt 22 relative to the accommodating element when tightening the pin. Afterwards, the rim of the accommodating element's floor is flanged upwardly into the position that can be seen in FIG. 1 and 2, to retain the threaded bolt 22, the helical springs 24 and 26, and the locking washers 28 and 20.

The assembled accommodating element 20 is then placed into an anchoring cage 50 that is installed with two rivets (not shown) onto the lowermost plate 60. For this purpose, the anchoring cage includes two openings 52 that lie on opposite sides of a feedthrough opening 54 and are intended to accept the rivets. The accommodating element further has two diametrically opposed teeth or tabs 38 located on its outer periphery, in the region of the entry opening for the pin 10, which likewise engage diametrically opposed cutouts 42 of laterally bent down flanges 56 of the anchoring cage 50.

Located in the region of the end of the pin 10 opposite its head 15 is a ring-shaped turnback 14. The pin also has three longitudinal recesses 17 that are disposed at angles of 120 degrees to one another and open toward the groove 16. Engaging these recesses 17 are three inward projections 66 of a ring 64 that is seated in a recess 48 disposed coaxially to the opening 13 of the uppermost plate 62, and is located on the side opposite the direction of introduction of the pin. By placing a snap ring 68 into the pin's turnback 14, the pin is prevented from falling out of the uppermost plate 62.

For tightening the two plates 60 and 62 together, the pin 10 that has been guided through the plate openings 12 and 13 is placed on the threaded bolt 22 of the accommodating element 20. By then rotating the pin, the pin's inner threads 11 engage the bolt's outer thread. At the same time, the two flanges 32 of the uppermost locking washer 30 engage the groove 16 of the pin, such that the locking washer thereafter rotates along with the pin. Further rotation of the pin draws it and locking washer 30 downwardly into the accommodating element 20, against the spring bias of the helical springs 24 and 26. This continues until the plates 60 and 62 are tightened firmly against each other, to a predetermined moment or torque. The two locking washers 28 and 30 then lie with their frusto-conical contacting surfaces held against each other by adhering friction. This prevents, in this tightened condition, an unintended loosening of the pin. The adhering friction can be selectively released by rotational engagement of a tool into the recess 19 of the head 15 of the pin 10, so that the two locking washers 28 and 30 are rotatable against each other against sliding friction that is smaller than the adhering friction.

Figure 4:
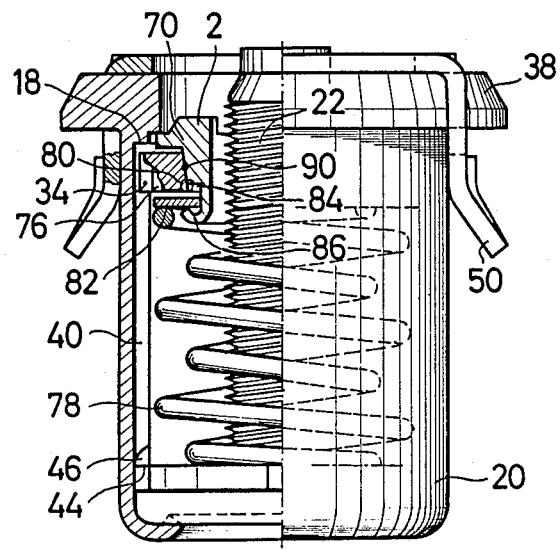
FIG. 4 is an elevational view, partially in section, of a second embodiment of a fastener in accordance with the invention, like FIG. 2 being shown with the pin removed and the components in their relaxed positions.

An alternative fastener embodiment is depicted in FIG. 4. This fastener embodiment differs from that of FIGS. 1-3 essentially by the following: a clamping claw 86 of the upper locking washer 70 engages the back side of the lower locking washer 76 through an opening 84, and with a flat spring washer 82 being interposed between the claw and the lower locking washer. This gives the locking washer arrangement a constant securing moment, independent of the depth of penetration of the pin 10. The assembly 80 of the locking washers 70 and 76 and the spring washer 82 supports itself on a single helical spring 78, which to avoid resonances has a variable diameter.

Figure 5:
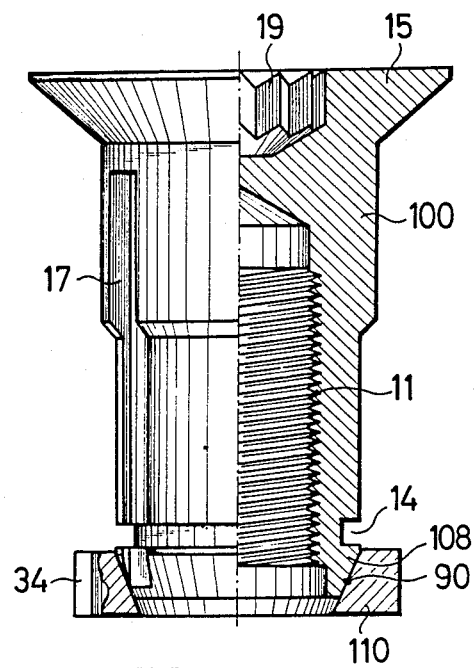
FIG. 5 is an elevational view, partially in section, of a pin and locking washer that are part of a third embodiment of a fastener in accordance with the invention, with one locking washer being constructed integrally with the pin.

FIG. 5 depicts an alternative configuration for the pin 10 of the embodiments of FIGS. 1-4. In this modified pin 100, the upper locking washer 108 is formed not as a self-standing structural part, but rather in a single piece at the lower end of the pin shaft. This modified washer configuration cooperates with the lower locking washer 110, at a cone angle 90, to function similarly to the locking washers 28 and 30 of the embodiment of FIGS. 1-3.

Although the invention has been described in detail with reference only to the preferred embodiments, those of ordinary skill in the art will appreciate that various modifications can be made without departing from the invention. Accordingly, the invention is defined only by the following claims.

I claim:

1. Fastener apparatus for joining together two plates having aligned openings, comprising:
    an internally threaded pin adapted to be guided through aligned openings in the plates;
    a generally cup-shaped accommodating element;
    a threaded bolt mounted centrally within the accommodating element, for threadedly receiving the pin;
    spring means located within the accommodating element and yieldably resisting entry of the pin therein; and
    securing means located within the accommodating element for preventing an unintended loosening of the pin from the bolt, the securing means including two locking washers accommodated on the threaded bolt and engaging each other when the pin is threaded onto the bolt, wherein the locking washer that faces the pin is rotatably guided and axially displaceable up to an external stop of the accommodating element, and wherein the locking washer that faces away from the pin is prevented from rotating, but guided in displaceable fashion in the accommodating element against the yielding resistance of the spring means, such that the locking washer that faces the pin, under action of a torque applied by the pin that exceeds a certain value, is rotatable relative to the locking washer that faces away from the pin and the pin is threaded onto the bolt to a tightened position, and wherein the locking washers have conforming, frusto-conical frictional surfaces that engage each other under adhering friction while the pin is threaded fully onto the bolt and that engage with each other with a lesser, sliding friction while the pin is rotating relative to the bolt, and wherein the cone angle of the conforming, frusto-conical surfaces of the locking washers is substantially self-restraining.

2. Fastener apparatus according to claim 1, wherein at least one of the conforming frictional surfaces of the locking washers is formed of a wear-fast material containing a permanent lubricating substance.

3. Fasteners apparatus according to claim 1, wherein the spring means presses together the conforming, frictional surfaces of the locking washers.

4. Fastener apparatus according to claim 1, wherein the locking washers are part of an assembly that further includes a spring for pressing together the conforming, frictional surfaces of the locking washers with a force that is independent of the depth of penetration of the pin into the accommodating element.

5. Fastener apparatus according to claim 4, wherein one of the locking washers includes a clamping claw for engaging the other locking washer through an opening in the other locking washer.

6. Fastener apparatus according to claim 1, wherein the spring means includes a helical spring having a variable diameter.

7. Fastener apparatus according to claim 1, wherein the locking washer that faces the pin is integral with the pin.

* * * * *